United States Patent
Colmenares Diaz et al.

(10) Patent No.: US 12,367,192 B2
(45) Date of Patent: Jul. 22, 2025

(54) QUERY ADMISSION CONTROL FOR ONLINE DATA SYSTEMS BASED ON RESPONSE TIME OBJECTIVES

(71) Applicant: Microsoft Technology Licensing, LLC, Redmond, WA (US)

(72) Inventors: Juan A. Colmenares Diaz, Santa Clara, CA (US); Hao Xu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 17/521,582

(22) Filed: Nov. 8, 2021

(65) Prior Publication Data

US 2023/0141570 A1      May 11, 2023

(51) Int. Cl.
*G06F 16/2453* (2019.01)
*G06F 16/27* (2019.01)
(Continued)

(52) U.S. Cl.
CPC ........ *G06F 16/24542* (2019.01); *G06F 16/27* (2019.01); *G06F 16/9024* (2019.01); *G06F 16/953* (2019.01)

(58) Field of Classification Search
CPC ............... G06F 16/24542; G06F 16/27; G06F 16/9024; G06F 16/953
See application file for complete search history.

(56) References Cited

U.S. PATENT DOCUMENTS

| | | | |
|---|---|---|---|
| 7,933,745 B2 * | 4/2011 | Krishnamurthy | ... H04L 41/5009 702/186 |
| 8,688,727 B1 * | 4/2014 | Das | ................... G06F 16/24575 707/766 |

(Continued)

FOREIGN PATENT DOCUMENTS

CN         113157541 A *    7/2021    .......... G06F 11/3447

OTHER PUBLICATIONS

"Azure Cosmos DB", Retrieved from: https://azure.microsoft.com/en-us/services/cosmos-db/, Oct. 7, 2021, 30 Pages.

(Continued)

*Primary Examiner* — Ann J Lo
*Assistant Examiner* — Fernando M Mari Valcarcel
(74) *Attorney, Agent, or Firm* — Nicholson De Vos Webster & Elliott LLP (57) ABSTRACT

Exemplary embodiments include tracking processing time metrics of multiple server queries. A processing time per query type is estimated using the tracked processing time metrics. A current queue wait time is estimated based on a number of queries currently in the queue and the estimated processing times of query types for each of the queries currently in the queue. Upon receiving a current server query from a client, the current query type is mapped to an estimated processing time determined using the tracked processing time metrics. An estimated response time is determined using the current queue wait time and the estimated processing time. The server query is rejected from being added to the queue in response to determining the estimated response time does not satisfy a service level objective and an error message is sent to the client indicating the rejection of the server query.

20 Claims, 5 Drawing Sheets

(51) Int. Cl.
G06F 16/901 (2019.01)
G06F 16/953 (2019.01)

(56) References Cited

U.S. PATENT DOCUMENTS

| | | | | |
|---|---|---|---|---|
| 2010/0082603 | A1* | 4/2010 | Krompass | G06F 16/24542 |
| | | | | 707/719 |
| 2012/0109873 | A1* | 5/2012 | Xiong | G06Q 30/01 |
| | | | | 706/52 |
| 2013/0086238 | A1* | 4/2013 | Li | H04L 67/288 |
| | | | | 709/223 |
| 2014/0075030 | A1* | 3/2014 | Wang | G06F 9/5027 |
| | | | | 709/226 |
| 2020/0126428 | A1* | 4/2020 | Tonosaki | G06Q 50/30 |
| 2021/0286809 | A1* | 9/2021 | Frost | G06F 16/2428 |
| 2021/0303576 | A1* | 9/2021 | Ouyang | G06F 16/24549 |

OTHER PUBLICATIONS

"Graph", Retrieved from: https://web.archive.org/web/20210228032333/https://engineering.linkedin.com/teams/data/data-infrastructure/graph, Feb. 28, 2021, 3 Pages.
"Handling Overload", Retrieved from: https://web.archive.org/web/20210817123726/https://sre.google/sre-book/handling-overload/, Aug. 17, 2021, 19 Pages.
"LinkedIn's Economic Graph", Retrieved from: https://web.archive.org/web/20210922215731/https://economicgraph.linkedin.com/, Sep. 22, 2021, 10 Pages.
Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.
Bronson, et al., "TAO: Facebook's Distributed Data Store for the Social Graph", In Proceedings of USENIX Annual Technical Conference, Jun. 26, 2013, pp. 49-60.
Carter, et al., "Nanosecond indexing of graph data with hash maps and vlists", In Proceedings of the International Conference on Management of Data, Jun. 30, 2019, pp. 623-635.
Cho, et al., "Overload control for US-scale rpcs with breakwater", In Proceedings of 14th {USENIX} Symposium on Operating Systems Design and Implementation, Nov. 4, 2020, pp. 299-314.
Chou, et al., "Taiji: Managing global user traffic for large-scale internet services at the edge", In Proceedings of the 27th ACM Symposium on Operating Systems Principles, Oct. 27, 2019, pp. 430-446.
Colajanni, et al., "Scheduling Algorithms for Distributed Web Servers", In Proceedings of The 17th International Conference on Distributed Computing Systems, May 27, 1997, pp. 169-176.
Corbett, et al., "Spanner: Google's globally distributed database", In Journal of ACM Transactions on Computer Systems, vol. 31, Issue 3, Aug. 1, 2013, 22 Pages.
Cuervo, Alejandrof, "Load Balancing in the Datacenter", Retrieved from: https://web.archive.org/web/20210812232817/https://sre.google/sre-book/load-balancing-datacenter/, Aug. 12, 2021, 25 Pages.
Decandia, et al., "Dynamo: Amazon's Highly Available Key-value Store", In Proceedings of twenty-first ACM SIGOPS symposium on Operating systems principles, Oct. 14, 2007, pp. 205-220.
Jones, et al., "Service Level Objectives", Retrieved from: https://web.archive.org/web/20210812111354/https://sre.google/sre-book/service-level-objectives/, Aug. 12, 2021, 17 Pages.
Jonker, et al., "Millions of targets under attack: A macroscopic characterization of the dos ecosystem", In Proceedings of the Internet Measurement Conference, Nov. 2017, 14 Pages.
Kim, Eugene, "Internal documents show how Amazon scrambled to fix Prime Day glitches", Retrieved from: https://www.cnbc.com/2018/07/19/amazon-internal-documents-what-caused-prime-day-crash-company-scramble.html, Jul. 19, 2018, 12 pages.
Kopp, et al., "DDoS never dies? an IXP perspective on DDOoS amplification attacks", In Proceedings of 22nd International Conference on Passive and Active Measurement, Mar. 29, 2021, 17 Pages.
Kreps, et al., "Kafka: a Distributed Messaging System for Log Processing", In Proceedings of 6th International Workshop on Networking Meets Databases (NetDB), Co-located with SIGMOD 2011, Jun. 12, 2011, 7 pages.
Lefebvre, William, "CNN.com: Facing a World Crisis", In 15th Systems Administration Conference, Dec. 2, 2001, 3 Pages.
Lewandowski, Piotr, "Load Balancing at the Frontend", Retrieved from: https://web.archive.org/web/20210817134750/https://sre.google/sre-book/load-balancing-frontend/, Aug. 17, 2021, 10 Pages.
Liu, et al., "Imprecise computations", In Proceedings of the IEEE, vol. 82, Issue: 1, Jan. 1994, pp. 83-94.
Mallapur, Anil, "TrafficShift: Load Testing at Scale", Retrieved from: https://engineering.linkedin.com/blog/2017/05/trafficshift-load-testing-at-scale, May 11, 2017, 8 Pages.
Meyer, Scott, "Liquid: The soul of a new graph database, Part 1", Retrieved from: https://engineering.linkedin.com/blog/2020/liquid-the-soul-of-a-new-graph-database-part-1, Jul. 23, 2020, 16 Pages.
Meyer, et al., "Liquid: The soul of a new graph database, Part 2", Retrieved from: https://engineering.linkedin.com/blog/2020/liquid--the-soul-of-a-new-graph-database--part-2, Sep. 16, 2020, 18 Pages.
Mittal, Sparsh, "A survey of techniques for approximate computing", In Journal of ACM Computing Surveys, vol. 48, No. 4, Mar. 2016, 33 Pages.
Purnell, Spence, "State Unemployment Websites Crash as COVID-19 Shines Light on Government Technology Failures", Retrieved from: https://reason.org/commentary/state-unemployment-websites-crash-as-covid-19-shines-light-on-government-technology-failures/, Apr. 13, 2020, 3 Pages.
Schroeder, et al., "Web servers under overload: How scheduling can help", In Journal of ACM Transactions on Internet Technology, Feb. 2006, pp. 20-52.
Szopa, et al., "Doorman", Retrieved from: https://web.archive.org/web/20210818230127/https://github.com/youtube/doorman, Aug. 18, 2021, 8 Pages.
Tene, et al. "wrk2", Retrieved from: https://web.archive.org/web/20210816171416/https://github.com/giltene/wrk2, Aug. 16, 2021, 22 Pages.
Veeraraghavan, et al., "Kraken: Leveraging Live Traffic Tests to Identify and Resolve Resource Utilization Bottlenecks in Large Scale Web Services", In Proceedings of 12th USENIX Symposium on Operating Systems Design and Implementation (OSDI '16), USENIX Association, 2016, Nov. 2, 2016, 19 Pages.
Welsh, et al., "Adaptive overload control for busy internet servers", In Proceedings of In USENIX Symposium on Internet Technologies and Systems, Mar. 26, 2003, 31 Pages.
Xiong, et al., "ActiveSLA: a profit-oriented admission control framework for database-as-a-service providers", In Proceedings of the 2nd ACM Symposium on Cloud Computing, Oct. 27, 2011, 14 Pages.
Zhan, et al., "Analyticdb: Real-time OLAP database system at alibaba cloud", In Proceedings of the VLDB Endowment, vol. 12, No. 12, Aug. 1, 2019, pp. 2059-2070.
Zhou, et al., "Overload control for scaling WeChat microservices", In Proceedings of the ACM Symposium on Cloud Computing, Oct. 11, 2018, pp. 149-161.
Bartolini, et al., "Self -*Through Self-Learning: Overload Control for Distributed Web Systems", In Journal of Computer Networks, vol. 53, Issue 5, Apr. 9, 2009, 30 Pages.
Blanquer, et al., "Quorum: Flexible Quality of Service for Internet Services", In Proceedings of the 2nd USENIX Symposium on Networked Systems Design and Implementation, Mar. 28, 2005, pp. 159-174.
Chen, et al., "Session-Based Overload Control in QoS-Aware Web Servers", In Proceedings of the 21st Annual Joint Conference of the IEEE Computer and Communications Societies, Jun. 23, 2002, pp. 516-524.

(56) References Cited

OTHER PUBLICATIONS

Cherkasova, Ludmila, "Scheduling Strategy to Improve Response Time for Web Applications", In Proceedings of the International Conference on High-Performance Computing and Networking, Apr. 21, 1998, 9 Pages.

Elnikety, et al., "A Method for Transparent Admission Control and Request Scheduling in E-Commerce Web Sites", In Proceedings of the 13th International Conference on World Wide Web, May 17, 2004, pp. 276-286.

Hao, et al., "MittOS: Supporting Millisecond Tail Tolerance with Fast Rejecting SLO-Aware OS Interface", In Proceedings of the 26th Symposium on Operating Systems Principles, Oct. 28, 2017, pp. 168-183.

Jamin, et al., "A Measurement-based Admission Control Algorithm for Integrated Service Packet Networks (Extended Version)", In Journal of IEEE/ACM Transactions on Networking, vol. 5, Issue 1, Feb. 1997, 20 Pages.

Nam, et al., "Measurement-Based Admission Control at Edge Routers", In Journal of IEEE/ACM Transactions on Networking, vol. 16, Issue 2, Apr. 8, 2008, pp. 410-423.

Schroeder, et al., "How to Determine a Good Multi-Programming Level for External Scheduling", In Proceedings of the 22nd International Conference on Data Engineering, Apr. 3, 2006, 12 Pages.

Tozer, et al., "Q-Cop: Avoiding Bad Query Mixes to Minimize Client Timeouts Under Heavy Loads", In Proceedings of the IEEE 26th International Conference on Data Engineering, Mar. 1, 2010, pp. 397-408.

Veeraraghavan, et al., "Maelstrom: Mitigating Datacenter-level Disasters by Draining Interdependent Traffic Safely and Efficiently", In Proceedings of the 13th USENIX Symposium on Operating Systems Design and Implementation, Oct. 8, 2018, pp. 373-389.

Moenkeberg, et al., "Performance Evaluation of an Adaptive and Robust Load Control Method for the Avoidance of Data-Contention Thrashing", In Proceedings of the 18th International Conference on Very Large Data Bases, Aug. 23, 1992, pp. 432-443.

Yang, et al., "Joint Admission Control and Routing Via Approximate Dynamic Programming for Streaming Video Over Software-Defined Networking", In Journal of IEEE Transactions on Multimedia, vol. 19, Issue 3, Nov. 15, 2016, 14 Pages.

Zhang, et al., "Workload Management in Database Management Systems: A Taxonomy", In Journal of IEEE Transactions on Knowledge and Data Engineering, vol. 30, Issue 7, Jul. 1, 2018, pp. 1386-1402.

Zhou, et al., "Selective Early Request Termination for Busy Internet Services", In Proceedings of the 15th International Conference on World Wide Web, May 23, 2006, pp. 605-614.

\* cited by examiner

QUERY ADMISSION CONTROL FOR ONLINE DATA SYSTEMS BASED ON RESPONSE TIME OBJECTIVES

TECHNICAL FIELD

The present disclosure generally relates to admission control for online data systems, and more specifically, relates to admission control of online data system queries based on response time objectives.

BACKGROUND

A distributed data processing system provides a software framework for distributed storage and processing of data on a large scale. A distributed software framework may store portions of a database across many different servers on a network. The distributed data processing system coordinates data create, read, write, update, and delete operations, query operations, as well as computations across the network of servers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Internet-based service providers rely on low-latency distributed data processing systems to provide quick responses to their users. These large-scale systems answer queries from clients demanding millisecond-scale response times. Each server in such a system can receive tens to hundreds of thousand queries per second. Planned and unplanned capacity reduction (e.g., fewer servers to process queries due to a network outage, a distributed denial of service attack, etc.) can lead to excessive traffic loads for individual servers. Large-scale online data systems can employ various techniques for overload management to ensure continued operation in presence of excessive traffic. Such techniques include load balancing, per-client quotas, and admission control policies.

Aspects of the present disclosure are directed to an admission controller managing traffic loads for servers in a distributed data processing system based on response time objectives. An admission controller determines whether to accept or reject client requests based on the load status of a system, e.g., to prevent the system from failing when receiving too much traffic. In addition to managing admission and rejection of requests for the system to reach but not exceed peak capacity, the admission controller can be expected to meet service level objectives for admitted requests. For example, when the traffic approaches or exceeds the system's capacity, other distributed data processing system admission control policies may not meet or at least track closely the response time service level objectives (SLOs) for serviced queries.

Aspects of the present disclosure address the above and other deficiencies by providing server query admission control based on response time SLOs. For example, an admission controller within a distributed data processing system measures or otherwise tracks processing time metrics of server queries and estimates a processing time per query type using the tracked processing time metrics. The admission controller estimates a current queue wait time based on a number of queries currently in the queue (per query type) and the estimated processing times of query types for each of the queries currently in the queue.

Upon receiving a current server query from a client, the admission controller maps the current query by type to an estimated processing time and determines an estimated response time using the current queue wait time and the estimated processing time for the current query type. The admission controller accepts or rejects the query in response to determining whether the estimated response time satisfies a response time SLO. By combining inexpensive estimates of queue wait time and processing time, embodiments keep serviced queries within SLOs, incur low overhead for millisecond-scale queries (e.g., an approximate mean overhead of 18 microseconds), allow systems to reach peak capacity and high utilization, and reject queries early to allow clients to react promptly. For example, for simulations of query rates at or above full utilization (e.g., in the range of 13,000 to 15,000 queries per second) and using an example response time SLO of 18 ms for one percentile, an embodiment of the admission controller described herein keeps serviced queries within the latency SLO while other policies, such as maximum queue wait time and maximum queue length, have mean response times above the SLO that range from approximately 22 ms to 40 ms.

Aspects of the present disclosure further address query starvation—i.e., the denial of service to classes of queries for long periods of time, especially under heavy traffic load. For example, it can be common for some query types to have response time SLOs that are tighter than those of other types (i.e., their percentile response times are closer to the values in their SLOs). When admitted queries share a common queue, it is possible that queries with looser SLOs will be accepted and, at or near capacity, cause an admission controller to reject queries with tighter SLOs in large numbers.

This complication is amplified when queries arrive at very high rates. In addition to determining whether the estimated response time satisfies a response time SLO, embodiments use the query type to ensure that a percentage or ratio of queries of each type is always admitted. As a result, embodiments override query rejections to mitigate query starvation while otherwise servicing queries within SLOs at peak capacity and high utilization. For example, a simulation of an embodiment of the admission controller described herein that does not include query starvation mitigation rejected more than 90% of queries with difficult SLOs (referred to below as "slow" queries) while rejecting less than 90% when including query starvation mitigation as a part of the admission control policy.

Figure 1:
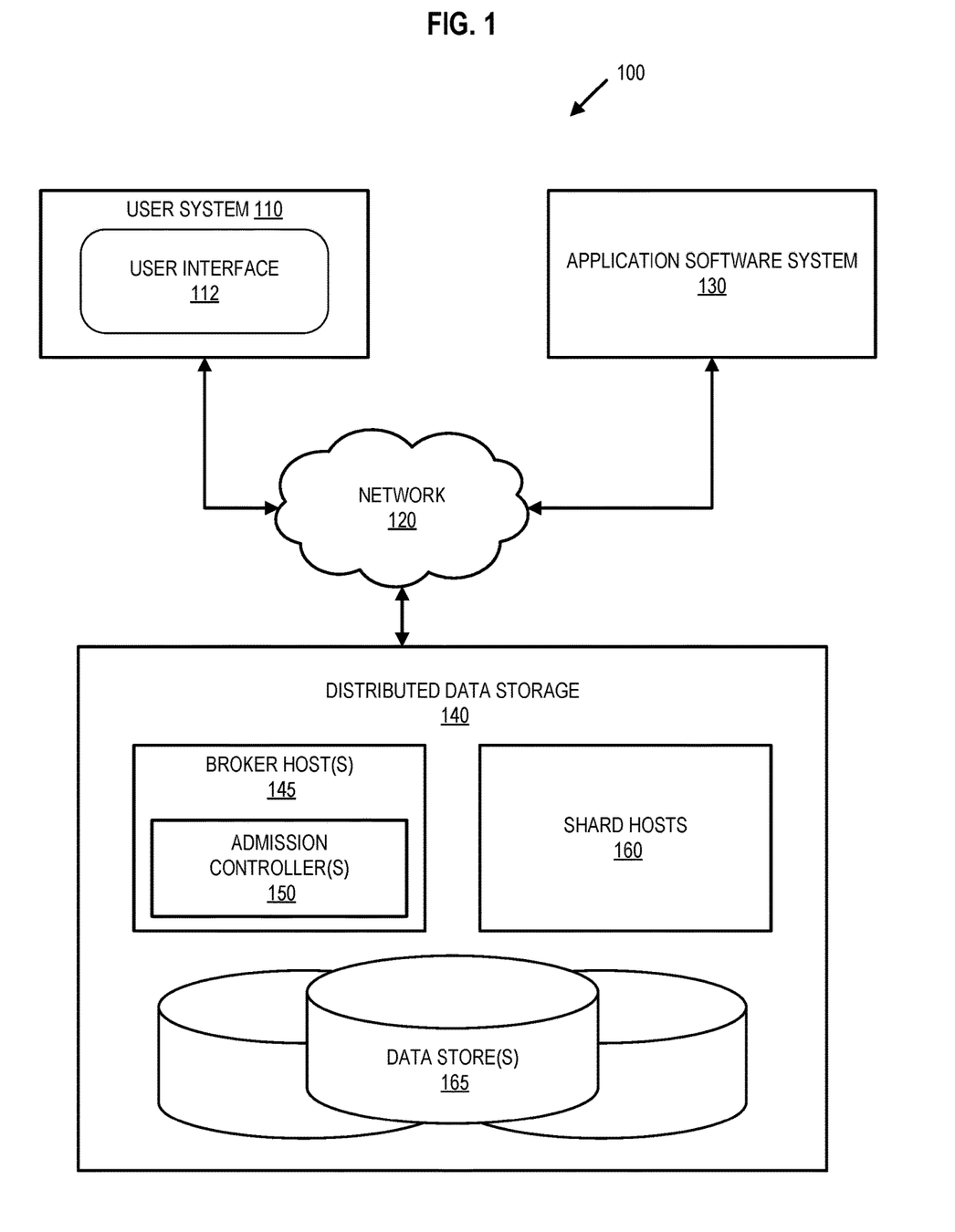
FIG. 1 illustrates an example computing system 100 that includes an admission controller 150 in accordance with some embodiments of the present disclosure.

FIG. 1 illustrates an example computing system 100 that includes an admission controller 150 in accordance with some embodiments of the present disclosure. In the embodiment of FIG. 1, computing system 100 includes a user system 110, a network 120, an application software system 130, and distributed data storage 140. User system 110, application software system 130, and distributed data storage 140 can each be implemented using at least one computing device that is communicatively coupled to electronic communications network 120. User system 110, application software system 130, and distributed data storage 140 are bidirectionally communicatively coupled by network 120. User system 110 as well as one or more different user systems (not shown) is also illustrated as being bidirectionally communicatively coupled to application software system 130.

While not specifically shown, any of user system 110, application software system 130, and distributed data storage 140 can include an interface embodied as computer programming code stored in computer memory that when executed causes a computing device to enable bidirectional communication with any other of user system 110, application software system 130, and distributed data storage 140 using a communicative coupling mechanism. Examples of communicative coupling mechanisms include network interfaces, inter-process communication (IPC) interfaces, and application program interfaces (APIs).

User system 110 includes at least one computing device, such as a personal computing device, a server, a mobile computing device, or a smart appliance. User system 110 includes at least one software application, including a user interface 112, installed on or accessible by a network to a computing device. In one example, user interface 112 is or includes a front-end portion of application software system 130. User interface 112 can be used to input search queries and view or otherwise perceive output that includes data produced by application software system 130 and/or stored in distributed data storage 140. For example, user interface 112 includes a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can also include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality provided by admission controller 150. Examples of application software system 130 include but are not limited to connections network software, such as social media platforms, and systems that are or are not be based on connections network software, such as general-purpose search engines, job search software, recruiter search software, sales assistance software, advertising software, learning and education software, or any combination of any of the foregoing.

In one embodiment, application software system 130 is a tool for querying and analyzing data stored in distributed data storage 140.

In some embodiments, client portion of application software system 130 operates in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application software system 130 and/or a server portion of application software system 130 receives the input, performs at least one operation using the input, and returns output using an HTTP response that the web browser receives and processes.

Distributed data storage 140 is a collection of one or more broker host server(s) 145, shard host servers 160, and data stores 165. For example, distributed data storage 140 is deployed as a cluster of servers/machines organized into two tiers, broker host server(s) 145 and shard host servers 160. In one embodiment, data stores 165 store a distributed in-memory database (i.e., database maintained in low-latency, volatile memory). In one embodiment, the distributed in-memory databased is a graph database. The distributed graph database contains data that may be retrieved and/or manipulated by application software system 130 to generate query results. The distributed graph database includes any number of nodes, edges, and predicates (i.e., semantic labels for the edges).

Distributed data storage 140 breaks up the graph into multiple data shards and assigns them to separate shard host servers 160, which store and index the graph data in memory. The broker host server(s) 145 receive query requests, e.g., from user systems 110 and/or application software system 130 (also referred to herein as clients), and broadcast one or more sub-queries to the shard host servers 160 to fetch data from data stores 165 for the query requests. In one example, the broker host server(s) 145 serves as representational state transfer (REST) endpoints for the application software system 130. The broker host server(s) 145 aggregate (if applicable) and transmit the response(s) from the shard host servers 160 to the user systems 110 and/or application software system 130.

Exemplary data stores 165 include non-volatile storage devices, volatile storage devices, or a combination thereof. Data stores 165 can reside within the same local network as at least one other device of computing system 100 (e.g., one or more shard host servers 160) and/or in a network that is remote relative to at least one other device of computing system 100. In some examples, shard host servers 160 maintain different portions of the graph database in high-speed volatile memory and periodically update copies of the graph database in non-volatile storage. Although distributed data storage 140 is depicted as being a singular component in computing system 100, portions of distributed data storage 140 are separately accessed over a network, such as network 120, in other examples.

The admission controller 150 rejects or admits online data system queries based on response time objectives. The disclosed technologies are described with reference to an example use case(s) of querying a distributed graph database; for example, a social graph application such as a professional social network application. The disclosed technologies are not limited to social graph applications but can be used to perform admission control policies for server queries more generally. The disclosed technologies can be used by many different types of network-based applications in which computing devices serve large volumes of online traffic and need to determine whether to admit or reject queries. Further details with regard to the operations of the admission controller(s) 150 are described below.

Figure 5:
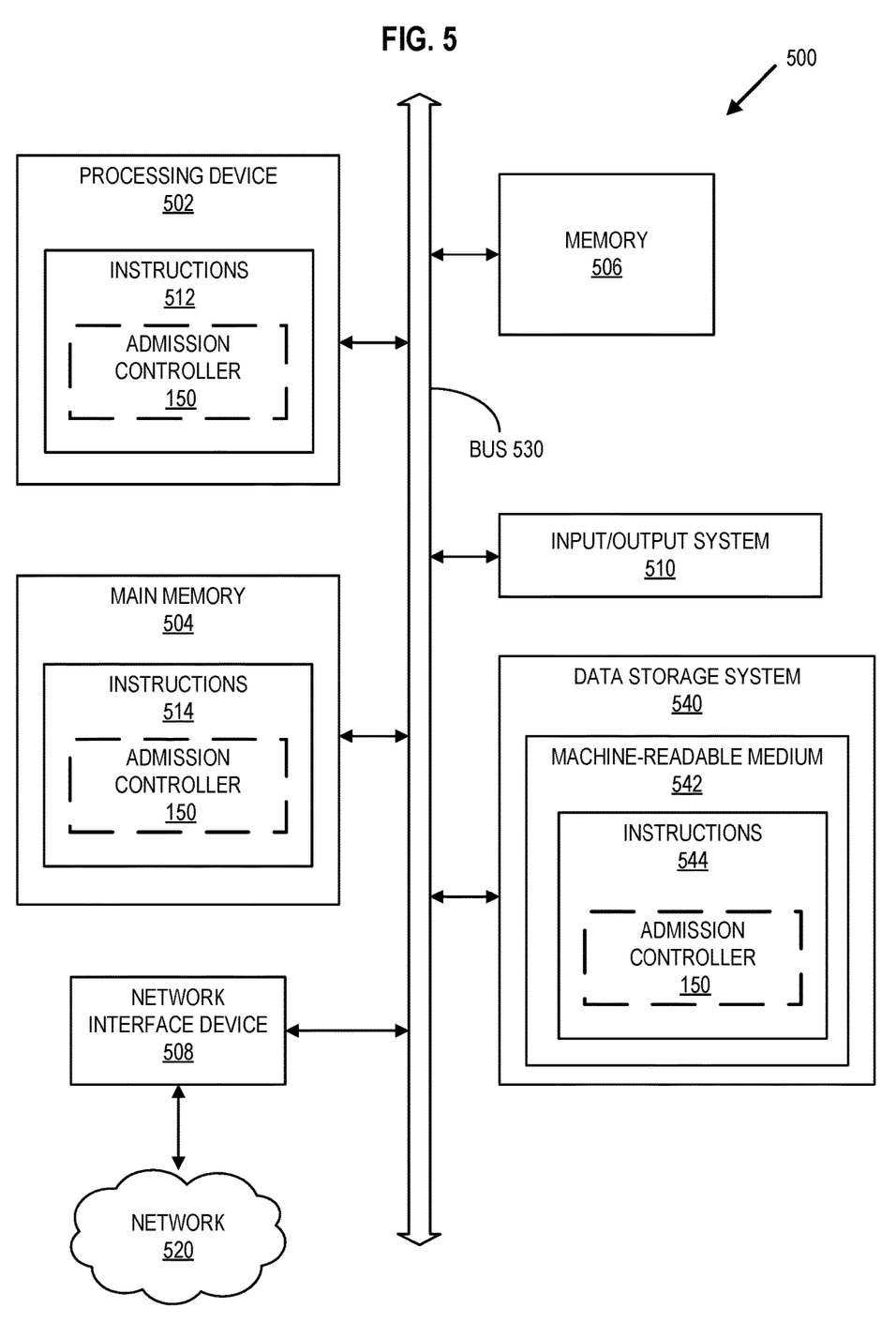
FIG. 5 is a block diagram of an example computer system in which embodiments of the present disclosure can operate.

One or more of the broker host servers 145 include an admission controller 150. As shown in FIG. 5, one embodiment of the admission controller 150 is implemented as instructions stored in a memory, and a processing device 502 is configured to execute the instructions stored in the memory to perform the operations described herein.

The features and functionality of user system 110, application software system 130, distributed data storage 140, admission controller 150 are implemented using computer software, hardware, or software and hardware, and can include combinations of automated functionality, data structures, and digital data, which are represented schematically in the figures. User system 110, application software system 130, distributed data storage 140, admission controller 150 are shown as separate elements in FIG. 1 for ease of discussion but the illustration is not meant to imply that separation of these elements is required. In some embodiments, the illustrated systems, services, and data stores (or their functionality) are distributed across any number of physical systems, including a single physical computer system, that communicate with each other in any appropriate manner.

Figure 2:
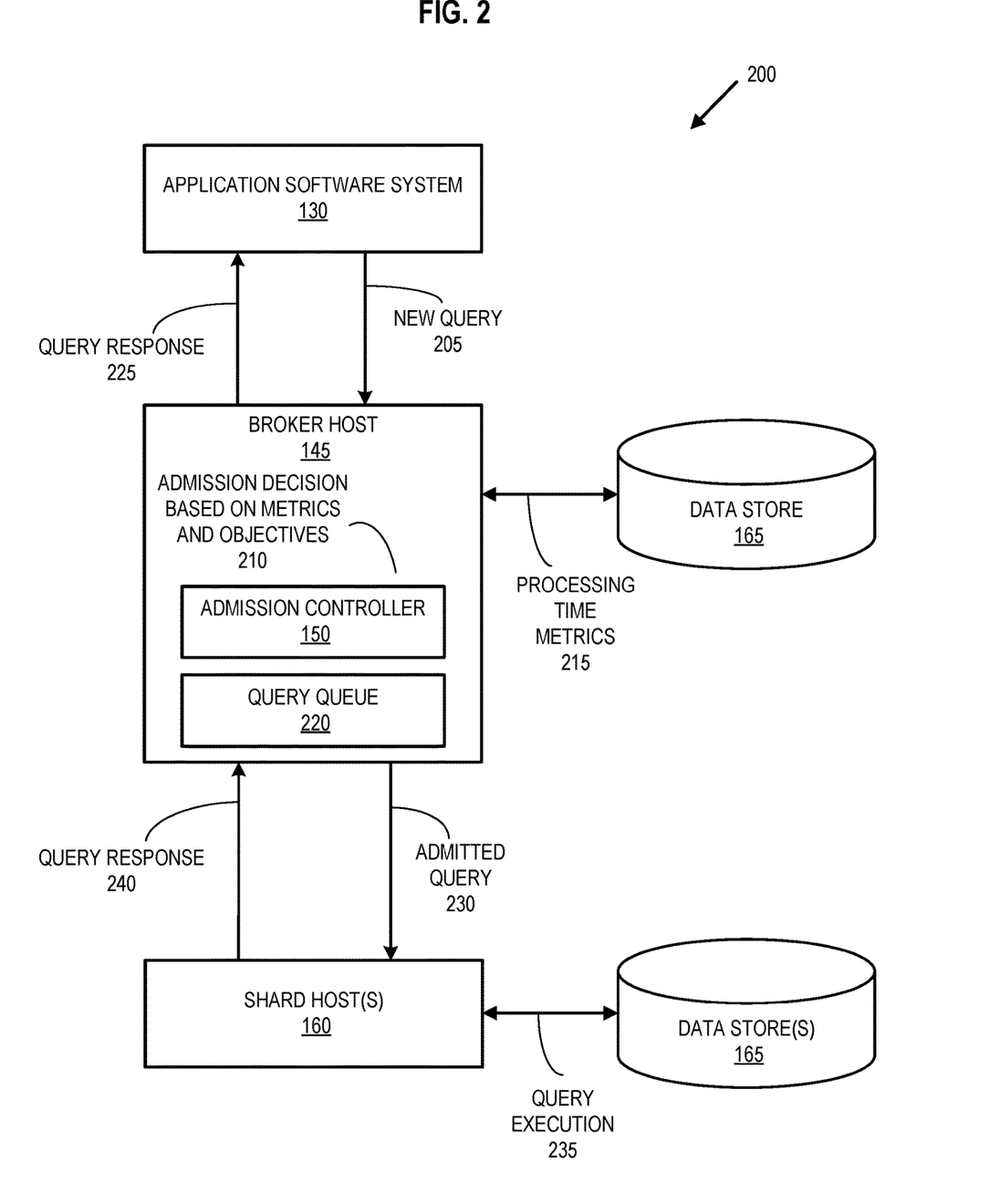
FIG. 2 is a module flow diagram of an example method 200 to implement admission control of online data system queries based on response time objectives between components of computing system 100 in accordance with some embodiments of the present disclosure.

FIG. 2 is a module-centric flow diagram of an example method 200 to implement admission control of online data system queries based on response time objectives between components of computing system 100 in accordance with some embodiments of the present disclosure. A broker host 145 receives a new server query 205 from the application software system 130. For example, user system 110 can issue the new server query via a network connection to application software system 130.

In one embodiment, the server query includes a short string or other indication of query type. For example, production workloads often include various types of queries with different latency characteristics. Some example server queries directed to a distributed graph database include simple edge queries, which return the vertices directly connected to a given vertex and are usually fast. In contrast, graph distance queries, which determine the shortest distance between two vertices, take longer to process.

An admission controller 150 (e.g., within the broker host 145) makes an admission decision based on performance metrics and service level objectives 210. For example, the admission controller 150 retrieves processing time metrics 215 from data store(s) 165 and estimates a response time using the time metrics for the query type of the new query, the number and type of queries currently in the query queue 220, and the corresponding time metrics for the query types in the query queue 220.

In one embodiment, admission controller 150 estimates a response time for each of one or more percentiles of performance metrics. For example, the response time of a query, RT(Q), is the sum of the processing time of the query, PT(Q), the wait time between enqueuing and dequeuing the query, WT(Q), and any additional time the server host takes to handle the query, which will be treated as negligible/zero for the sake of this illustration. Admission controller 150 estimates PT(Q) and WT(Q) by tracking query metrics. Separate query types often have different processing time distributions that vary over time. As such, admission controller 150 maintains approximations for these distributions in histograms, one per query type (including an "unknown" type), which admission controller 150 periodically updates at run time by tracking timing metrics during the processing of queries or similar measurements of processing times for various query types.

In one embodiment, query types are defined based on the cost, complexity, and/or the data accessed or retrieved. A query that retrieves the rows from a small table (e.g., a table of 20 buildings on a corporate campus) is an example of simple and fast query type. Another example of a simple and fast query type includes queries that retrieve simple values (e.g., integers or strings). An example of a moderately complex and slower query type includes a query that retrieves 50 rows of a table with the largest values in a column (e.g., the 50 employees with most patent applications in a corporation). Another example of a moderately complex and slower query type includes a query that retrieves collections of values (e.g., a list, set, and hash table). An example of highly complex and slow query type includes a query that performs joins across several tables and aggregates results.

In addition, admission controller 150 maintains an atomic count of queries for each query type currently in the queue and updates the counts as queries are enqueued in the query queue 220 and dequeued from the query queue 220 for processing by one or more shard hosts 160. In one embodiment, the processing time histograms and query counts are stored in mapped data structures with the query types as the keys for efficient access.

In one embodiment, admission controller 150 estimates WT(Q) as a mean queue wait time as follows:

$$WT(Q) = \sum\nolimits_{type \in QT} \frac{\text{count(type)} \times PT_{mean}(\text{type})}{P}$$

QT is the set of query types, count (type) is number of queries of the given type of query currently enqueued, $PT_{mean}$ is the mean processing time for queries of the given type based on histogram data, and P is the number of query engine processes running on the host (i.e., the level of task parallelism for query processing).

In one embodiment, admission controller 150 estimates RT(Q) for one or more percentiles using histogram data for each respective percentile and the corresponding query type. For example, admission controller 150 estimates the 50th- and 90th-percentile response times (RT) as follows:

$RT_{p50}(Q)=WT(Q)+PT_{p50}(\text{type})$; and $RT_{p90}(Q)=WT(Q)+PT_{p90}(\text{type})$.

In some embodiments, admission controller 150 stores, or otherwise maintains, the processing time histograms in mapped data structures with the query types as the keys for efficient access to one or more percentile response times, $PT_{pX}(\text{type})$ and $PT_{pY}(\text{type})$, where X and Y represent different percentile values. As such, WT(Q) and each RT(Q) are inexpensive estimations that keep the admission policy's overhead low (e.g., an approximate mean overhead of 18 µs for millisecond-scale response times).

In one embodiment, admission controller 150 determines if one or each estimated response time satisfies a corresponding service level objective. For example, admission controller 150 compares each estimated RT(Q) with a target percentile response time for the query type, SLO(type), to determine whether to accept or reject the query. Continuing the example of 50th- and 90th-percentile response times, admission controller 150 rejects the query if either $RT_{p50}$ (Q)>SLO$_{p50}$(type) or RT$_{p90}$(Q)>SLO$_{p90}$(type). While these examples are directed to 50th- and 90th-percentile response times, embodiments of admission controller 150 support SLOs with other percentile response times in lieu of or in addition to p50 and p90. In one example, admission controller 150 uses one or more percentile response times of various percentile values.

Additionally, if admission controller 150 does not yet have sufficient histogram data for a given query type, an embodiment of admission controller 150 uses histogram data from queries of various types that have been served. For example, admission controller 150 maintains a general histogram that captures the processing times of queries regardless of their types. In response to determining that an estimated processing time for a current query type has not been determined using the tracked processing time metrics (e.g., due to insufficient metrics for the query type), an embodiment of admission controller 150 uses the general histogram processing time metrics to determine a general estimated processing time and corresponding estimated response time for the server query using the current queue wait time and the general estimated processing time.

In another embodiment, admission controller 150 uses a secondary admission control policy for a server query in response to determining that a processing time for the query type has not been determined. For example, some embodiments of admission controller 150 use one or more of (1) a maximum queue length policy that simply accepts an incoming query if the queue's length is less than a threshold length limit, (2) a maximum queue wait time policy that accepts a query if the estimate for query's mean queue wait time is less than or equal to a threshold time limit, and (3) an acceptance fraction policy that periodically computes the fraction of queries to accept as a function of available and demanded processing capacities (e.g., accepting the fraction of queries indicated by the available processing capacity divided by the demanded processing capacity).

In one embodiment, admission controller 150 overrides a determination to reject a query based on a service level objective. For example, it is possible that queries with SLOs that are more easily met relative to other queries (e.g., "faster queries") cause queries with SLOs that are more difficult to meet (e.g., "slower queries") to be rejected in large numbers, especially when queries arrive at very high rates. To avoid the "starvation" of slower queries, an embodiment of admission controller 150 overrides some rejections of queries based on query type and a history of query types admitted to the query queue 220. In one embodiment, admission controller 150 tracks, within a sliding window of time, the number of accepted queries (AQ$_{count}$) per query type and the number of received queries, both accepted and rejected, (RQ$_{count}$) per query type. For example, admission controller 150 tracks the AQ$_{count}$ values and RQ$_{count}$ values within a sliding window of time with a duration, D, and "slides" the window with a time step, $\Delta$, where D>>$\Delta$ (e.g., D=1 s and $\Delta$=10 ms).

Using a minimum allowance policy, admission controller 150 overrides a query rejection to ensure that a minimum number or percentage of each query type is admitted to the queue. For example, if AQ$_{count}$ for a current query type is less than a threshold value or if an acceptance ratio, AR=AQ$_{count}$/RQ$_{count}$, is less than a threshold ratio, an embodiment of admission controller 150 overrides the query rejection and enqueue the query. Setting the threshold ratio, e.g., to 0.01 would ensure that up to 1% of queries of a given/each type will be accepted regardless of the service level determination described above.

Additionally, some embodiments of admission controller 150 override the query rejection when RQ$_{count}$ is equal to zero or otherwise below a threshold value. In another embodiment, admission controller 150 overrides the query rejection probabilistically, e.g., by generating a random number and overriding the rejection when the random number satisfies a threshold value, thereby accepting approximately some number or percentage of rejected queries by override.

In yet another embodiment, admission controller 150 overrides the query rejection when the acceptance ratio for the query type is less than the average acceptance ratio of all query types within the sliding window of time. Additionally, some embodiments of admission controller 150 use a heuristic to calculate a probability, P, to mitigate a tendency to provide excessive overrides for a query type with a low acceptance ratio.

In such an embodiment, when the acceptance ratio (AR) for the query type is less than the average acceptance ratio (AAR) of all query types, admission controller 150 uses a probabilistic determination, such as the sigmoid function, P=$\alpha \cdot x/(1+|x|)$, where x=(AAR$-$AR)/AAR, $\alpha$ is a scaling factor used as a configuration parameter (e.g., selected as a value from the set ranging from 0 to 1), and admission controller 150 overrides the rejection when it generates a random number that is less than P. In other embodiments, admission controller 150 uses another probability function to mitigate a tendency to provide excessive overrides for a query type with a low acceptance ratio. The use of a sigmoid function is an example provided for the sake of illustration.

The starvation avoidance techniques discussed above can prevent queries with tighter SLOs or queries that are otherwise slow from being rejected excessively. Additionally, when the admission controller 150 lacks metrics/histogram data (i.e., a "cold start"), the starvation avoidance techniques can allow for the acceptance of queries while the admission controller 150 tracks metrics and populates the corresponding histograms.

When the admission controller 150 rejects a query, the admission controller 150 sends an error message indicating the rejection as a query response 225 to the application software system 130. When the admission controller 150 accepts a query, the admission controller 150 adds the query to the query queue 220 and updates the query metrics (e.g., time the query was enqueued and incrementing a count for that query type currently enqueued). In one embodiment, the admission controller 150 stores/updates the query metrics 215 in memory/data store 165.

In some embodiments, the broker host 145 removes a query from the query queue 220 and transmits the removed query as one or more subqueries 230 to one or more shard host servers 160. Using a distributed graph database as an example, queries vary in complexity and, as a result, involve a different number of subqueries/shard host servers 160. Basic edge queries, for instance, retrieve the vertices directly connected to an input vertex (e.g., the first-degree connections). Other queries are more complex. For example, graph distance queries determine the shortest distance between two vertices when traversing the connected relationships, up to a maximum distance equal to 3, and network size queries calculate the size of the first-, second-, or third-degree connections for a vertex. When the broker host 145 dequeues a query, it updates the query metrics 215 (e.g., time the query was dequeued and decrementing a count for that query type currently enqueued).

In one embodiment, the query queue 220 is a first-in, first-out (FIFO) queue. The broker host 145 dequeues a query according to the FIFO order and, in some embodiments, in response to an indication that one or more shard host servers 160 are available to receive the query/subqueries.

The one or more shard host servers 160 fetch data from data store(s) 165 for or otherwise execute the subquery requests 235. As described in the distributed graph examples above, an example execution of the query includes fetching vertices, determining a number of connections to a vertex, determining a shortest distance between vertices, among other data retrieval and compute actions. The one or more shard host servers 160 return the results of the execution of the subquery requests 240 to the broker host 145.

In response to receiving the results of the execution of the subquery requests 240, the broker host 145 updates the query metrics 215 (e.g., the time the query processing was complete). In tracking the time a query was dequeued and the time the query results are received, the admission controller 150 measures or otherwise determines a processing time for the query and update the histogram data for the corresponding query type. In one embodiment, the admission controller 150 maintains two histograms, a current histogram used for determining estimated response times as described above and a subsequent histogram used for updating metrics. Upon satisfying a threshold (e.g., an amount of time or new metric values), embodiments of the admission controller 150 swap the histograms, making the subsequent histogram the new current histogram and using the prior current histogram to track updated metrics as the new subsequent histogram.

Further in response to receiving the results of the execution of the subquery requests 240, the broker host 145 sends the query response 225 to the application software system 130.

Figure 3:
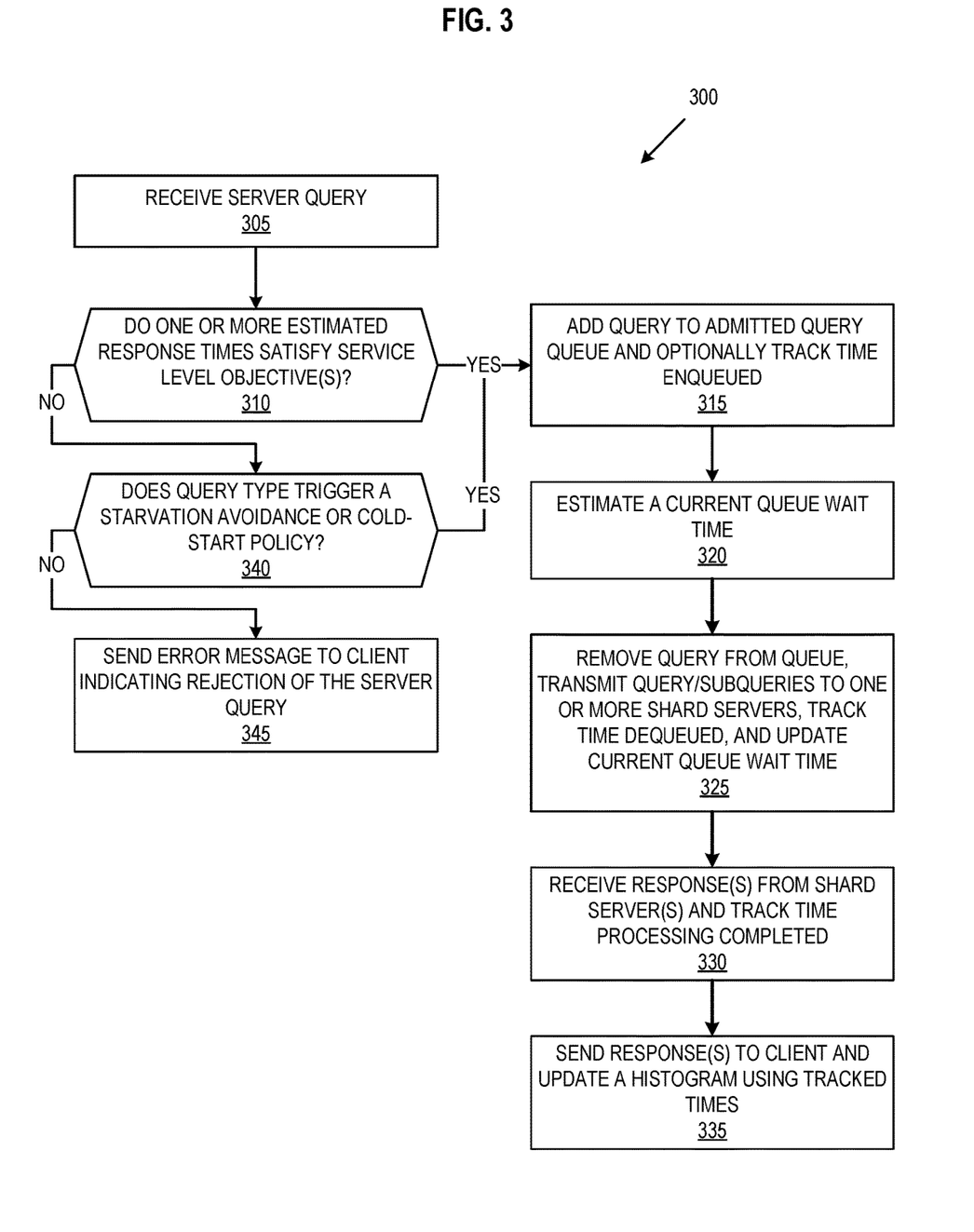
FIG. 3 is a flow diagram of an example method 300 to implement admission control of online data system queries based on response time objectives in accordance with some embodiments of the present disclosure.

FIG. 3 is a flow diagram of an example method 300 to implement admission control of online data system queries based on response time objectives in accordance with some embodiments of the present disclosure. In some embodiments, the method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by an admission controller 150 of FIG. 1.

Although shown in a particular sequence or order, unless otherwise specified, the order of the processes can be modified. Thus, the illustrated embodiments should be understood only as examples, and other embodiments of the illustrated processes are performed in a different order, and/or some processes are performed in parallel. Additionally, some embodiments omit one or more processes. Thus, not all processes are required in every embodiment. Other process flows are possible.

At operation 305, the processing device receives a server query from a client. For example, a broker host 145 receives a new server query from the application software system 130 as described above. In one embodiment, the server query includes a string or other indication of query type.

At operation 310, the processing device determines if one or more estimated response times satisfy service level objective(s). As described above, some embodiments of the admission controller 150 map the query type (or the general type) to histogram data and determine an estimated response time, RT(Q), for one or more percentiles using the histogram data for each respective percentile. If one or more estimated response times are greater than a corresponding SLO for that percentile, embodiments of the admission controller 150 determine that the query is to be rejected. If one or more estimated response times are less than or equal to a corresponding SLO for that percentile, embodiments of the admission controller 150 determine that the query is to be accepted. Additionally, some embodiments of the admission controller 150 override the rejection of a query as described above, e.g., when applying a starvation avoidance policy.

If the processing device determines that the estimated response times satisfy service level objective(s), the method 300 proceeds to operation 315. If the processing device determines that one or more of the estimated response times do not satisfy service level objective(s), the method 300 proceeds to operation 340.

At operation 315, the processing device, when the query is accepted, adds the query to the admitted query queue. Additionally, the processing device updates one or more metrics for tracking query processing. For example, the admission controller 150 increments a count of enqueued queries of the type of the current query. In one embodiment, the admission controller 150 also saves the time the query is enqueued to track the actual queue waiting time for the query.

At operation 320, the processing device estimates a current queue wait time. For example, embodiments of the admission controller 150 update the estimation of the queue wait time each time a query is enqueued or dequeued. In one embodiment, the admission controller 150 adds the estimated mean processing time for the query type to an existing estimated queue wait time when adding a query to the queue. In another embodiment, the admission controller 150 determines the estimated queue wait time as described above with reference to FIG. 2.

At operation 325, the processing device removes a query from the queue and transmits the query or related subqueries to one or more shard servers. For example, embodiments of the broker host server 145 pop a query off a FIFO query queue 220 as described above. Additionally, admission controller 150 tracks the time the query is dequeued to determine updated processing time metrics for the query type and updates the current queue wait time, e.g., by subtracting the estimated mean processing time for the query type from the existing estimated queue wait time or otherwise as described with reference to operation 320 and above with reference to FIG. 2.

At operation 330, the processing device receives one or more response(s) from shard host(s) 160 and tracks the time processing completed for the corresponding query. For example, embodiments of the admission controller 150 determine the processing time for the query as the difference between the time the response(s) are received and the time the query was dequeued.

At operation 335, the processing device sends one or more response(s) to the client and updates a histogram using tracked times. As described above, the broker host server 145 returns query results to application software system 130 and the admission controller 150 updates a histogram for the query type with the determined processing time metric.

At operation 340, if the estimated processing time fails to satisfy a service level objective, the processing device determines if the query type triggers a starvation avoidance or cold-start policy. For example, embodiments of the admission controller 150 override the rejection of a query as described above with reference to FIG. 2. If the query type triggers a starvation avoidance or cold-start policy, the method 300 overrides the rejection and proceeds to operation 315. If the query type does not trigger a starvation avoidance or cold-start policy, the method 300 maintains the query rejection determination and proceeds to operation 345.

At operation 345, the processing device sends an error message to the client indicating rejection of the server query. By using low-overhead estimations, the admission controller 150 rejects queries early, allowing clients to react promptly.

Figure 4:
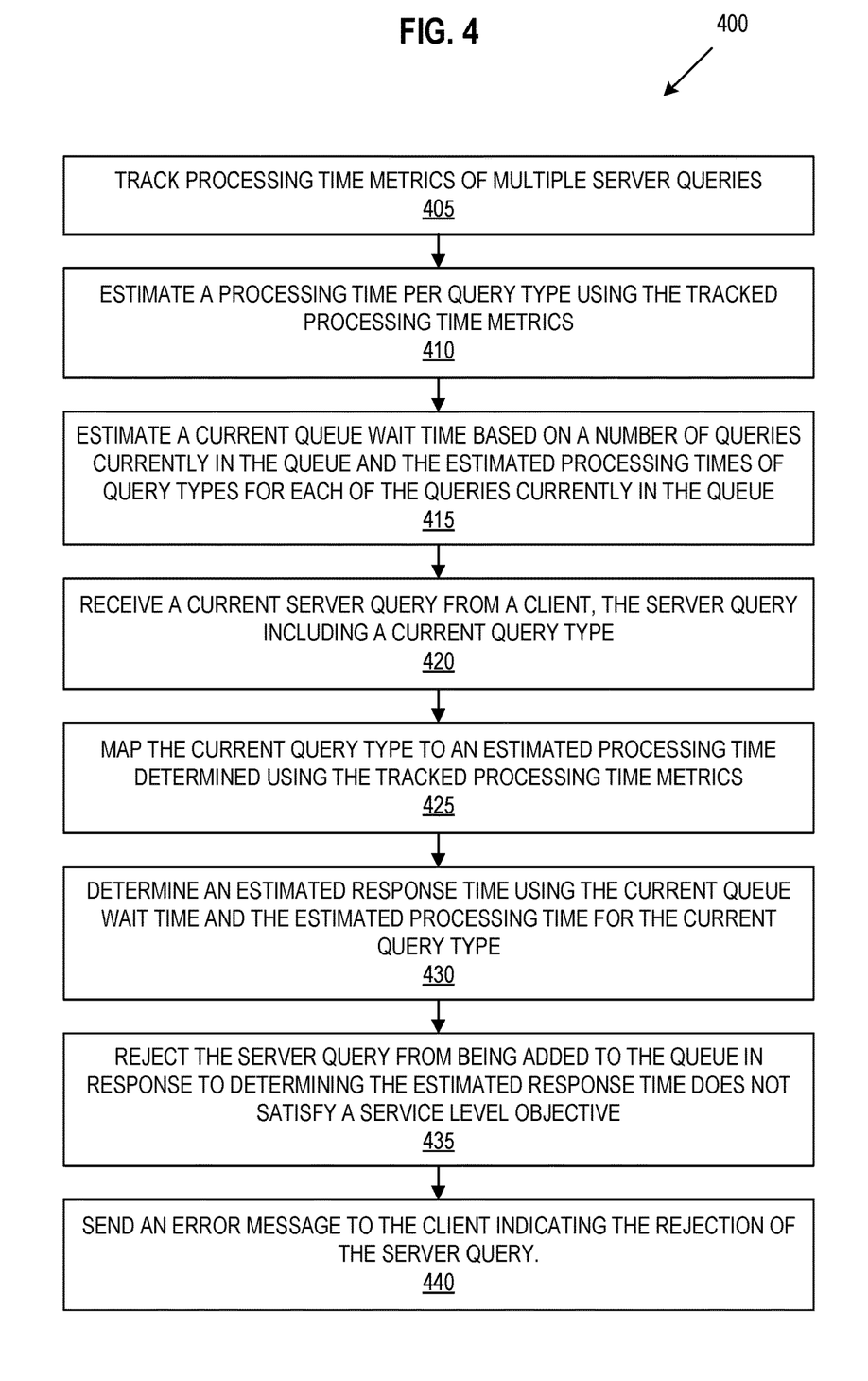
FIG. 4 is a flow diagram of another example method 400 to implement admission control of online data system queries based on response time objectives in accordance with some embodiments of the present disclosure.

FIG. 4 is a flow diagram of another example method 400 to implement admission control of online data system queries based on response time objectives in accordance with some embodiments of the present disclosure. In one embodiment, the method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by an admission controller 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device tracks processing time metrics of multiple server queries. As described above, the admission controller 150 tracks or otherwise obtains a time a query is enqueued, a time the query is dequeued, and a time query execution is completed by one or more shard hosts 160. As a result, the admission controller 150 can track/measure and update actual processing times for query types in corresponding histograms.

At operation 410, the processing device estimates a processing time per query type using the tracked processing time metrics. For example, the admission controller 150 determines the difference between time the query is dequeued and the time query execution is completed and updates a histogram. The admission controller 150 uses the percentile buckets in each histogram to estimate a processing time per query type for each percentile.

At operation 415, the processing device estimates a current queue wait time based on a number of queries currently in the queue and the estimated processing times of query types for each of the queries currently in the queue. For example, the admission controller 150 estimates a current queue wait time using the count of each query type currently enqueued and a mean processing time for those query types as described above with reference to FIG. 2.

At operation 420, the processing device receives a current server query from a client. For example, a broker host 145 receives a new server query from the application software system 130 as described above. In one embodiment, the server query includes a string or other indication of query type.

At operation 425, the processing device maps the current query type to an estimated processing time determined using the tracked processing time metrics. For example, the admission controller 150 stores the processing time histograms and query counts in mapped data structures with the query types as the keys for efficient access.

At operation 430, the processing device determines an estimated response time using the current queue wait time and the estimated processing time for the current query type. For example, the admission controller 150 determines the current queue wait time and the estimated processing time for the current query type as described above with reference to FIG. 2.

At operation 435, the processing device rejects the server query from being added to the queue in response to determining the estimated response time does not satisfy a service level objective. For example, when the admission controller 150 determines the estimated response time for the query type of the current server query is greater than a service level objective, the admission controller 150 rejects the query. In one embodiment, the rejection further includes determining that the query type does not trigger an override as described above with reference to FIG. 2.

At operation 440, the processing device sends an error message to the client indicating the rejection of the server query. Again, by using the low-overhead estimations described above, the admission controller 150 rejects queries early, allowing clients to react promptly.

FIG. 5 illustrates an example machine of a computer system 500 within which a set of instructions, for causing the machine to perform any one or more of the methodologies discussed herein, can be executed. In some embodiments, the computer system 500 corresponds to a component of a networked computer system (e.g., the computer system 100 of FIG. 1) that includes, is coupled to, or utilizes a machine to execute an operating system to perform operations corresponding to an admission controller 150 of FIG. 1. The machine can be connected (e.g., networked) to other machines in a local area network (LAN), an intranet, an extranet, and/or the Internet. In some embodiments, the machine operates in the capacity of a server or a client machine in a client-server network environment, as a peer machine in a peer-to-peer (or distributed) network environment, or as a server or a client machine in a cloud computing infrastructure or environment.

Exemplary machines include a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a memory 506 (e.g., flash memory, static random access memory (SRAM), etc.), an input/output system 510, and a data storage system 540, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In some embodiments, processing device 502 is one or more special-purpose processing devices such as an application specific integrated circuit (ASIC), a field programmable gate array (FPGA), a digital signal processor (DSP), network processor, or the like. The processing device 502 is configured to execute instructions 512 for performing the operations and steps discussed herein.

Admission controller 150 is shown in dashed lines as part of instructions 512 to illustrate that, at times, portions of admission controller 150 are executed by processing device 502. However, it is not required that all of admission controller 150 be included in instructions 512 at the same time and portions of admission controller 150 are stored in one or more other components of computer system 500 at other times, e.g., when one or more portions of admission controller 150 are not being executed by processing device 502.

The computer system 500 can further include a network interface device 508 to communicate over the network 520. Network interface device 508 can provide a two-way data communication coupling to a network. For example, network interface device 508 can be an integrated-services digital network (ISDN) card, cable modem, satellite modem, or a modem to provide a data communication connection to a corresponding type of telephone line. As another example, network interface device 508 can be a local area network (LAN) card to provide a data communication connection to a compatible LAN. Wireless links can also be implemented. In any such implementation network interface device 508 can send and receives electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 500.

Computer system 500 can send messages and receive data, including program code, through the network(s) and network interface device 508. In the Internet example, a server can transmit a requested code for an application program through the Internet and network interface device 508. The received code can be executed by processing device 502 as it is received, and/or stored in data storage system 540, or other non-volatile storage for later execution.

The input/output system 510 can include an output device, such as a display, for example a liquid crystal display (LCD) or a touchscreen display, for displaying information to a computer user, or a speaker, a haptic device, or another form of output device. The input/output system 510 can include an input device, for example, alphanumeric keys and other keys configured for communicating information and command selections to processing device 502. An input device can, alternatively or in addition, include a cursor control, such as a mouse, a trackball, or cursor direction keys for communicating direction information and command selections to processing device 502 and for controlling cursor movement on a display. An input device can, alternatively or in addition, include a microphone, a sensor, or an array of sensors, for communicating sensed information to processing device 502. Sensed information can include voice commands, audio signals, geographic location information, and/or digital imagery, for example.

The data storage system 540 can include a machine-readable storage medium 542 (also known as a computer-readable medium) on which is stored one or more sets of instructions 544 or software embodying any one or more of the methodologies or functions described herein. The instructions 544 can also reside, completely or at least partially, within the main memory 504 and/or within the processing device 502 during execution thereof by the computer system 500, the main memory 504 and the processing device 502 also constituting machine-readable storage media. For example, when at least some portion of admission controller 150 is embodied in instructions to cause processing device 502 to perform the method(s) described above, some of those instructions can be read into processing device 502 (e.g., into an internal cache or other memory) from main memory 504 and/or data storage system 540. However, as indicated by dashed lines for admission controller 150, it is not required that all of admission controller 150 be included in instructions 512/514/544 at the same time. The illustration of computer system 500, therefore, includes various embodiments of storing, reading, and executing such instructions to implement admission controller 150.

In one embodiment, the instructions 514/544 include instructions to implement functionality corresponding to an admission controller (e.g., one of the admission controller(s) 150 of FIG. 1). While the machine-readable storage medium 542 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer.

For example, an embodiment of the computer system or other data processing system, such as the computing system 100, carries out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   tracking, by a controller, processing time metrics of multiple server queries, wherein the controller is configured to accept or reject server queries based on a load status of a computer system;
   generating a processing time histogram per query type based on the processing time metrics;
   updating the processing time histogram per query type, wherein the processing time histogram per query type comprises an approximation of a processing time distribution per query type;
   estimating a processing time per query type using the processing time histogram per query type;
   estimating a current wait time for a server query queue using query type processing times;
   receiving a current server query associated with a response time service level objective from a client, the current server query including a current query type;
   mapping the current query type to an estimated processing time determined using the processing time histogram for the current query type;
   determining an estimated response time using the current wait time and the estimated processing time for the current query type;
   rejecting the current server query from being added to the server query queue in response to determining the estimated response time does not satisfy the response time service level objective of the current server query; and
   sending an error message to the client indicating the rejection of the server query.

2. The method of claim 1, wherein determining the estimated response time is for a first service level percentile of the estimated processing time, the method further comprising:
   determining a second estimated response time using the current wait time and a second service level percentile of the estimated processing time for the current query type; and
   determining the second estimated response time satisfies a second response time service level objective.

3. The method of claim 1, wherein tracking processing time metrics of multiple server queries includes maintaining a histogram per query type.

4. The method of claim 3, wherein tracking processing time metrics of multiple server queries includes maintaining a general histogram representing processing time metrics of multiple query types, the method further comprising:
   receiving a second server query, the second server query including a second query type based on a complexity of the second server query;
   determining that a processing time for the second query type has not been determined using the tracked processing time metrics;
   determining a general estimated processing time using the general histogram processing time metrics; and
   determining an estimated response time for the second server query using the current wait time and the general estimated processing time.

5. The method of claim 1, wherein the server queries are directed to an in-memory database distributed across a cluster of host servers.

6. The method of claim 5, wherein the in-memory database is a distributed graph database.

7. The method of claim 1, further comprising:
   receiving a second server query, the second server query including a second query type based on a complexity of the second server query;
   mapping the second query type to a second estimated processing time determined using the tracked processing time metrics;
   determining a second estimated response time using the current wait time and the second estimated processing time for the second query type;
   determining the second estimated response time does not satisfy a second response time service level objective of the second server query;
   overriding a rejection of the second server query in response to determining a historical number of queries of the second query type satisfies a threshold; and
   adding the second server query to the server query queue in response to the override.

8. The method of claim 7, further comprising:
receiving a second server query, the second server query including a second query type based on a complexity of the second server query;
determining a second estimated response time using the current wait time and a second estimated processing time for the second query type;
determining the second estimated response time does not satisfy a response time service level objective;
overriding a rejection of the second server query in response to determining an acceptance ratio for the second query type is less than an average acceptance ratio; and
adding the second server query to the server query queue in response to the override.

9. A system comprising:
at least one memory device; and
a processing device, operatively coupled with the at least one memory device, to:
track, by a controller, processing time metrics of multiple server queries, wherein the controller is to accept or reject server queries based on a load status of a computer system;
generate a processing time histogram per query type based on the processing time metrics;
update the processing time histogram per query type, wherein the processing time histogram per query type comprises an approximation of a processing time distribution per query type;
estimate a processing time per query type using the processing time histogram per query type;
estimate a current wait time for a server query queue using query type processing times;
receive a current server query associated with a response time service level objective from a client, the current server query including a current query type;
map the current query type to an estimated processing time determined using the processing time histogram for the current query type;
determine an estimated response time using the current wait time and the estimated processing time for the current query type;
reject the current server query from being added to the server query queue in response to determining the estimated response time does not satisfy the response time service level objective of the current server query; and
send an error message to the client indicating the rejection of the server query.

10. The system of claim 9, wherein determining the estimated response time is for a first service level percentile of the estimated processing time, and wherein the processing device is further to:
determine a second estimated response time using the current wait time and a second service level percentile of the estimated processing time for the current query type; and
determine the second estimated response time satisfies a second service level objective.

11. The system of claim 9, wherein tracking processing time metrics of multiple server queries includes maintaining a histogram per query type.

12. The system of claim 11, wherein tracking processing time metrics of multiple server queries includes maintaining a general histogram representing processing time metrics of multiple query types, and wherein the processing device is further to:
receive a second server query, the second server query including a second query type based on a complexity of the second server query;
determine that a processing time for the second query type has not been determined using the tracked processing time metrics;
determine a general estimated processing time using the general histogram processing time metrics; and
determine an estimated response time for the second server query using the current wait time and the general estimated processing time.

13. The system of claim 9, wherein the server queries are directed to an in-memory database distributed across a cluster of host servers.

14. The system of claim 13, wherein the in-memory database is a distributed graph database.

15. The system of claim 9, wherein the processing device is further to:
receive a second server query, the second server query including a second query type based on a complexity of the second server query;
map the second query type to a second estimated processing time determined using the tracked processing time metrics;
determine a second estimated response time using the current wait time and the second estimated processing time for the second query type;
determine the second estimated response time does not satisfy a response time service level objective of the second server query;
override a rejection of the second server query in response to determining a historical number of queries of the second query type satisfies a threshold; and
add the second server query to the server query queue in response to the override.

16. The system of claim 9, wherein the processing device is further to:
receive a second server query, the second server query including a second query type based on a complexity of the second server query;
determine a second estimated response time using the current wait time and a second estimated processing time for the second query type;
determine the second estimated response time does not satisfy a response time service level objective of the second server query;
override a rejection of the second server query in response to determining an acceptance ratio for the second query type is less than an average acceptance ratio; and
add the second server query to the server query queue in response to the override.

17. An apparatus comprising:
means for tracking, by a controller, processing time metrics of multiple server queries, wherein the controller is configured to accept or reject server queries based on a load status of a computer system;
means for generating a processing time histogram per query type based on the processing time metrics;
means for updating the processing time histogram per query type, wherein the processing time histogram per query type comprises an approximation of a processing time distribution per query type;
means for estimating a processing time per query type using the processing time histogram per query type;
means for estimating a current wait time for a server query queue using query type processing times;

means for receiving a current server query associated with a response time service level objective from a client, the current server query including a current query type;

means for mapping the current query type to an estimated processing time determined using the processing time histogram for the current query type;

means for determining an estimated response time using the current wait time and the estimated processing time for the current query type;

means for rejecting the current server query from being added to the server query queue in response to determining the estimated response time does not satisfy the response time service level objective of the current server query; and means for sending an error message to the client indicating the rejection of the server query.

18. The apparatus of claim 17, wherein tracking processing time metrics of multiple server queries includes maintaining a histogram per query.

19. The apparatus of claim 17, further comprising:

means for receiving a second server query, the second server query including a second query type based on a complexity of the second server query;

means for mapping the second query type to a second estimated processing time determined using the tracked processing time metrics;

means for determining a second estimated response time using the current wait time and the second estimated processing time for the second query type;

means for determining the second estimated response time does not satisfy the response time service level objective of the second server query;

means for overriding a rejection of the second server query in response to determining a historical number of queries of the second query type satisfies a threshold; and means for adding the second server query to the server query queue in response to the override.

20. The apparatus of claim 17, further comprising:

means for receiving a second server query, the second server query including a second query type based on a complexity of the second server query;

means for determining a second estimated response time using the current wait time and a second estimated processing time for the second query type;

means for determining the second estimated response time does not satisfy a second response time service level objective of the second server query;

means for overriding a rejection of the second server query in response to determining an acceptance ratio for the second query type is less than an average acceptance ratio; and means for adding the second server query to the server query queue in response to the override.

\* \* \* \* \*